(12) United States Patent
Nakata et al.

(10) Patent No.: US 11,503,267 B2
(45) Date of Patent: Nov. 15, 2022

(54) IMAGE PROCESSING DEVICE, CONTENT PROCESSING DEVICE, CONTENT PROCESSING SYSTEM, AND IMAGE PROCESSING METHOD

(71) Applicant: Sony Interactive Entertainment Inc., Tokyo (JP)

(72) Inventors: Masashi Nakata, Kanagawa (JP); Yasunori Matsui, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/771,908

(22) PCT Filed: Dec. 14, 2018

(86) PCT No.: PCT/JP2018/046100
§ 371 (c)(1),
(2) Date: Jun. 11, 2020

(87) PCT Pub. No.: WO2019/124248
PCT Pub. Date: Jun. 27, 2019

(65) Prior Publication Data
US 2020/0404238 A1    Dec. 24, 2020

(30) Foreign Application Priority Data
Dec. 21, 2017 (JP) .............................. JP2017244861

(51) Int. Cl.
*H04N 13/161* (2018.01)
*H04N 13/271* (2018.01)
*H04N 13/194* (2018.01)

(52) U.S. Cl.
CPC ......... *H04N 13/161* (2018.05); *H04N 13/194* (2018.05); *H04N 13/271* (2018.05)

(58) Field of Classification Search
CPC combination set(s) only.
See application file for complete search history.

(56) References Cited

U.S. PATENT DOCUMENTS 10,154,216 B2    12/2018  Hiasa
2009/0148038 A1*  6/2009  Sawachi ................. G06T 7/593
                                                          382/154

(Continued)

FOREIGN PATENT DOCUMENTS

CN      108389226 A      8/2018
EP        2076048 A2     7/2009

(Continued)

OTHER PUBLICATIONS

International Search Report for corresponding PCT Application No. PCT/JP2018/046100, 4 pages dated Feb. 5, 2019.

(Continued)

*Primary Examiner* — Md N Haque
(74) *Attorney, Agent, or Firm* — Matthew B. Dernier, Esq.

(57) ABSTRACT

In a depth image compressing section of an image processing device, a depth image operation section generates a depth image by operation using photographed stereo images. A difference image obtaining section generates a difference image between an actually measured depth image and the computed depth image. In a depth image decompressing section of a content processing device, a depth image operation section generates a depth image by operation using the transmitted stereo images. A difference image adding section restores a depth image by adding the computed depth image to the transmitted difference image.

17 Claims, 11 Drawing Sheets

(56) References Cited

U.S. PATENT DOCUMENTS

| | | | | |
|---|---|---|---|---|
| 2010/0185093 | A1* | 7/2010 | Hamilton | G01S 15/8993 600/443 |
| 2013/0222534 | A1 | 8/2013 | Rusanovskyy | |
| 2013/0287093 | A1* | 10/2013 | Hannuksela | H04N 19/30 375/240.02 |
| 2014/0035905 | A1* | 2/2014 | Lee | H04N 19/587 345/419 |
| 2014/0232822 | A1* | 8/2014 | Venkataraman | G06K 9/66 348/43 |
| 2014/0267243 | A1* | 9/2014 | Venkataraman | H04N 13/106 345/419 |
| 2017/0054901 | A1* | 2/2017 | Venkataraman | G06T 7/60 |
| 2017/0339363 | A1* | 11/2017 | Hiasa | H04N 5/2254 |

FOREIGN PATENT DOCUMENTS

| | | |
|---|---|---|
| EP | 2375752 A2 | 10/2011 |
| EP | 2693753 A | 7/2013 |
| JP | 06351006 A | 12/1994 |
| JP | 2009163717 A | 7/2009 |
| JP | 2015518338 A | 6/2015 |
| JP | 2017208641 A | 11/2017 |

OTHER PUBLICATIONS

International Preliminary Report on Patentability and Written Opinion for corresponding PCT Application No. PCT/JP2018/046100, 21 pages dated Jul. 2, 2020.

Supplementary Partial European Search Report Application No. EP18891483, 14 pages, dated Apr. 1, 2021.

Extended European Search Report for corresponding JP Application No. 18891483.2, 17 pages, dated Jul. 12, 2021.

Lee Pei June, et al., "Attention region based control algorithm for 3DVCdepth amp coding," 2016 International Conference on System Science and Engineering, 2 pages, Jul. 7, 2016.

Jinwook Choi, et al., "Spatial and Temporal up-conversion Technique for Depth Video," ICIP Image Processing, 2009 16th IEEE International Conference, pp. 3525-3528, Nov. 7, 2009.

Notification of Reasons for Refusal for corresponding JP Application No. 2017-244861, 14 pages, dated Jun. 16, 2021.

David Eigen, et al., "Depth Map Prediction from a Single Image Using a Multi-Scale Deep Network" Department of Computer Science, Courant Institute, New York University and Facebook AI Research, arXiv vol. 1, 19 pages, https://arxiv.org/abs/1406.2283v1 >, Jun. 9, 2014.

Ayan Chakrabarti, et al., "Depth from a Single Image by Harmonizing Overcomplete Local Network Predications", Conference on Neural Information Processing Systems (NIPS), arXiv version V2, 19 pages, https://arxiv.org/abs/1605.07081v2>, Jun. 14, 2021.

Notice of Reasons for Refusal for corresponding JP Application No. 2017-244861, 17 pages, dated Jan. 27, 2022.

* cited by examiner

FIG.6
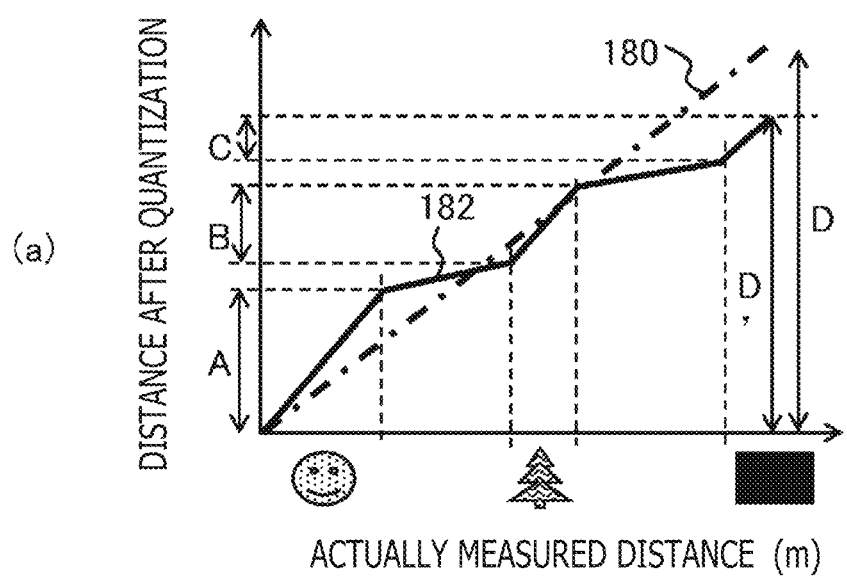
(a)
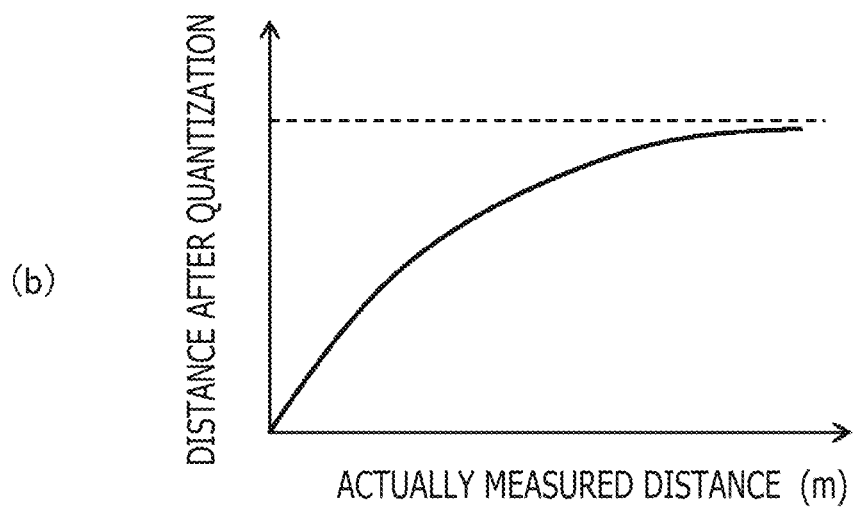
(b)

IMAGE PROCESSING DEVICE, CONTENT PROCESSING DEVICE, CONTENT PROCESSING SYSTEM, AND IMAGE PROCESSING METHOD

TECHNICAL FIELD

The present invention relates to an image processing device that performs processing including the compression of image data, a content processing device that performs processing using the image data, a content processing system including the image processing device and the content processing device, and image processing methods performed in the image processing device and the content processing device.

BACKGROUND ART

With the development of technologies of VR (Virtual Reality) and AR (Augmented Reality), information on a distance from an imaging plane to a subject, or what is generally called depth information has been regarded as increasingly important in addition to color images such as stereo images for realizing a stereoscopic view. The depth information enables a real object to be expressed by polygons, and enables stereoscopic video to be displayed without causing a feeling of strangeness even when a line of sight moves. Content providing a greater sense of realism and a greater sense of immersion can therefore be realized. In addition, the depth information is also important in realizing interaction in response to the action of a user in a VR space and an AR space by throwing a ball as a virtual object into a space represented as video, for example.

Various measuring methods have been proposed to obtain the depth information with high accuracy, the measuring methods including a method of applying reference light such as near infrared rays, and obtaining the depth information on the basis of a time taken to detect the reflected light, a method of obtaining the depth information on the basis of the distortion of distribution or intensity of the reflected light, and the like.

SUMMARY

Technical Problem

On the other hand, when the depth information obtained by such a distance measuring sensor is transmitted to a host terminal or the like together with the data of a color photographed image used for display or the like, it is considered that immediacy is lost or image quality is degraded due to limitation on a communication band. For example, conventionally, when the depth information is to be also transmitted using the communication band transmitting only the data of the color image, a measure of lowering the resolution of the color image or increasing a compression ratio is naturally needed, so that image quality tends to be degraded. Such a problem tends to become evident when a large-scale network such as the Internet is used or wireless communication is used.

The present invention has been made in view of such a problem, and it is an object of the present invention to provide a technology that can implement high-accuracy processing using actually measured depth information without increasing transmission data size.

Solution to Problem

A certain aspect of the present invention relates to an image processing device. The image processing device includes: a depth image obtaining section configured to obtain data of a depth image actually measured by a camera measuring a distance of a subject and having the distance as a pixel value; a photographed image obtaining section configured to obtain data of a plurality of photographed images formed by photographing the subject from different viewpoints; a depth image compressing section configured to compress the data of the depth image using the data of the plurality of photographed images; and an output section configured to output the data of the plurality of photographed images and the compressed data of the depth image.

Here, the "image processing device" may be any of a device itself that performs image processing, such as an information processing terminal, an information processing device, or a server connectable to various kinds of devices via a network, an integrated circuit constituting a part of those devices, and the like. Alternatively, the "image processing device" may be an imaging device, or may be an integrated circuit constituting a part of the imaging device.

Another aspect of the present invention relates to a content processing device. The content processing device includes: an image data obtaining section configured to obtain data of a plurality of photographed images formed by photographing a subject from different viewpoints and data after compression of a depth image actually measured by a camera measuring a distance of the subject and having the distance as a pixel value; a depth image decompressing section configured to decompress the data of the depth image after the compression using the data of the plurality of photographed images; and an output section configured to perform predetermined processing using at least the decompressed data of the depth image, and output a result.

Here, the "content processing device" may be any of a device itself that processes content, such as a head-mounted display, an information terminal, an information processing device, or a server connectable to various kinds of devices via a network, an integrated circuit constituting a part of those devices, and the like.

Yet another aspect of the present invention relates to a content processing system. The content processing system includes: an image processing device configured to transmit data of a depth image actually measured by a camera measuring a distance of a subject and having the distance as a pixel value and data of a plurality of photographed images formed by photographing the subject from different viewpoints; and a content processing device configured to perform information processing using the data of the depth image and the data of the photographed images; the image processing device including a depth image compressing section configured to compress the data of the depth image using the data of the plurality of photographed images, and an output section configured to output the data of the plurality of photographed images and the data of the depth image after the compression, and the content processing device including a depth image decompressing section configured to decompress the data of the depth image after the compression using the data of the plurality of photographed images, and an output section configured to perform predetermined processing using at least the decompressed data of the depth image, and output a result.

Yet another aspect of the present invention relates to an image processing method. The image processing method performed by an image processing device includes: a step of obtaining data of a depth image actually measured by a camera measuring a distance of a subject and having the distance as a pixel value; a step of obtaining data of a plurality of photographed images formed by photographing the subject from different viewpoints; a step of compressing the data of the depth image using the data of the plurality of photographed images; and a step of outputting the data of the plurality of photographed images and the compressed data of the depth image.

Yet another aspect of the present invention also relates to an image processing method. The image processing method performed by a content processing device includes: a step of obtaining data of a plurality of photographed images formed by photographing a subject from different viewpoints and data after compression of a depth image actually measured by a camera measuring a distance of the subject and having the distance as a pixel value; a step of decompressing the data of the depth image after the compression using the data of the plurality of photographed images; and a step of performing predetermined processing using at least the decompressed data of the depth image, and outputting a result.

It is to be noted that any combination of the above constituent elements as well as modes obtained by converting expressions of the present invention between a method, a device, a system, a computer program, a recording medium on which a computer program is recorded, and the like are also effective as modes of the present invention.

Advantageous Effect of Invention

According to the present invention, it is possible to implement high-accuracy information processing using a photographed image without increasing transmission data size.

BRIEF DESCRIPTION OF DRAWINGS

FIG. 6 depicts diagrams of assistance in explaining correspondence information for the pixel values before and after quantization, the correspondence information being used to decompress the depth image in the present embodiment.

DESCRIPTION OF EMBODIMENT

Figure 1:
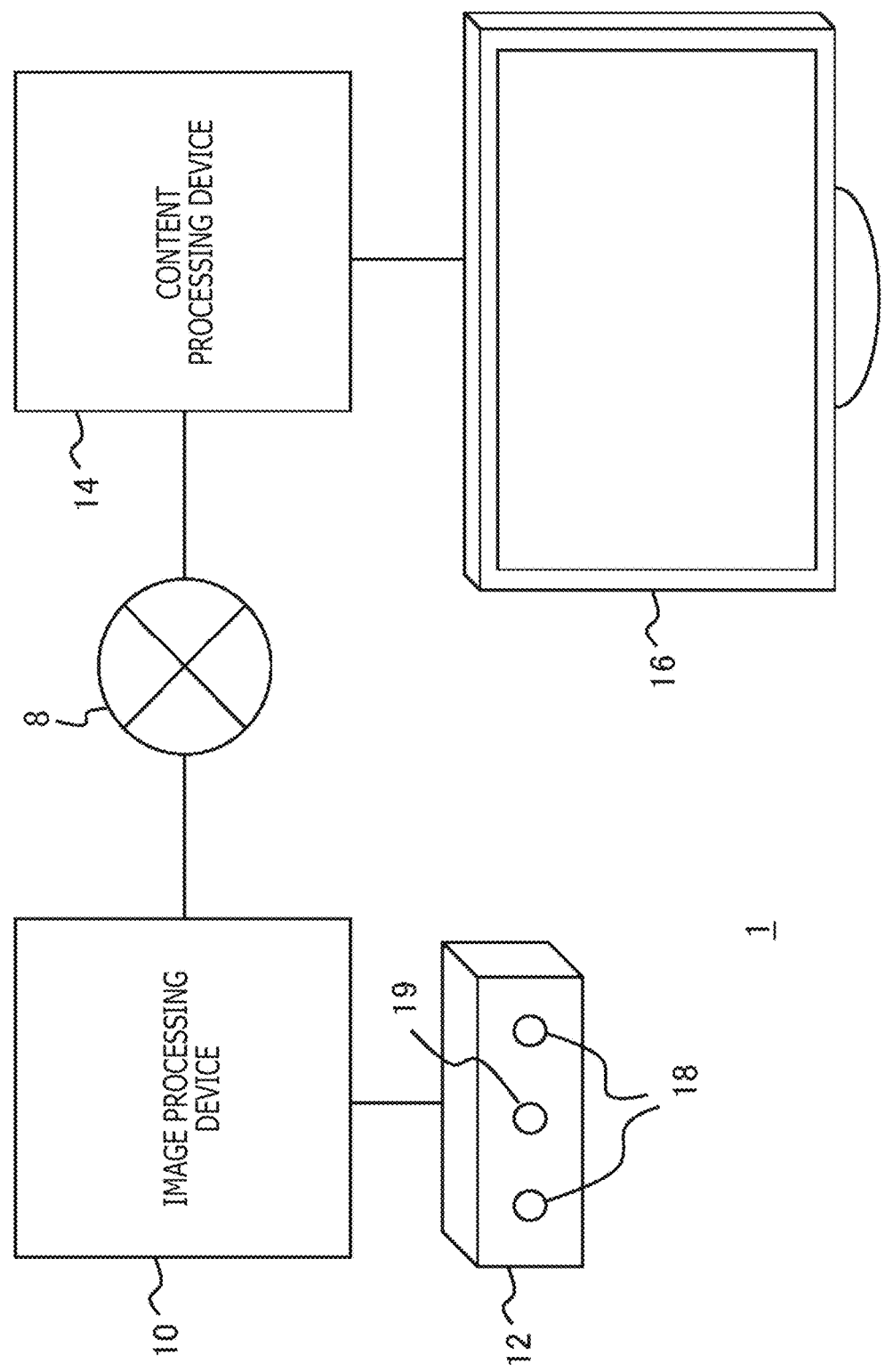
FIG. 1 is a diagram depicting an example of a configuration of a content processing system according to a present embodiment.

FIG. 1 depicts an example of a configuration of a content processing system to which a present embodiment can be applied. A content processing system 1 includes: an imaging device 12 that photographs a real space; an image processing device 10 that converts a photographed image into a form for transmission by processing a photographed image; a content processing device 14 that performs predetermined information processing using the photographed image transmitted thereto; and a display device 16 that outputs a result of the information processing. The image processing device 10 and the content processing device 14 establish communication therebetween via a network 8 as required.

Each of connections between the image processing device 10 and the imaging device 12 and between the content processing device 14 and the display device 16 may be established by wire cable. In addition, wireless connections may be made between the image processing device 10 and the imaging device 12 and between the content processing device 14 and the display device 16 by a wireless LAN (Local Area Network) or the like. Alternatively, the image processing device 10 and the imaging device 12 may be an integral device, and the content processing device 14 and the display device 16 may be an integral device. For example, the image processing device 10 and the imaging device 12 may be combined with each other to form an imaging device having a function of transmission to the network 8, or may be combined with each other to form a server that distributes content data. In addition, the content processing device 14 and the display device 16 may be combined with each other to form a portable terminal or a head-mounted display.

Further, the network 8 connecting the image processing device 10 and the content processing device 14 to each other may be a large-scale network such as the Internet, or may be a local network such as a LAN established by wired or wireless manner. The external shapes and connection forms of the imaging device 12, the image processing device 10, the content processing device 14, and the display device 16 are thus not limited to those depicted in the figure.

The imaging device 12 includes: stereo cameras 18 that photograph a subject space at a predetermined frame rate; and a depth camera 19 that obtains information regarding a distance to a subject in the same subject space at the predetermined frame rate. The stereo cameras 18 have a structure obtained by arranging, on a left side and a right side at a predetermined interval, video cameras including an imaging element such as a CMOS (Complementary Metal Oxide Semiconductor) sensor and an image processing mechanism that generates data of photographed images by subjecting output data of the imaging element to demosaicing processing, lens distortion correction, color correction, and the like.

The depth camera 19 is constituted of a mechanism for irradiating the subject space with reference light such as near infrared rays and a CMOS sensor that detects reflected light. The depth camera 19 derives the distance to the subject on the basis of a time taken from the irradiation to detection, distortion of distribution of the reflected light, or the like. The former method is a technology commonly known as a ToF (Time of Flight) method, and the latter method is a technology commonly known as a pattern irradiation method. However, the configuration of the depth camera and the method of deriving the distance are not intended to be limited to this. In any case, the imaging device 12 supplies the image processing device 10 at a predetermined rate with data of stereo images constituted of a pair of color images photographed from a left viewpoint and a right viewpoint and a depth image corresponding to the stereo images.

Incidentally, the depth image is an image indicating a distance value as a pixel value of an image of the subject. In addition, while the imaging device 12 in the figure has a sensor of the depth camera 19 disposed in the middle of sensors of the stereo cameras 18, the arrangement and number of sensors are not limited to this. For example, the depth camera may also be stereo cameras photographing from the left and right viewpoints, and arranged so as to be vertically adjacent to the stereo cameras photographing color images, or the stereo cameras photographing color images may serve also as the camera photographing the depth image. Incidentally, in the following description, a pair of ordinary photographed images that is not the depth image will be referred to as "stereo images."

The image processing device 10 compresses the data of the images supplied from the imaging device 12 into a transmission form, and then transmits the data to the content processing device 14 at a predetermined rate. Specifically, the data size of the depth image is reduced by utilizing the redundancy of the stereo images and the depth image. For example, a depth image is obtained by operation using the stereo images, and a difference image between the depth image and a depth image as a result of actual measurement by the depth camera is set as data of depth information after compression.

The content processing device 14 reconstructs the depth image by decompressing the compressed depth information in the thus transmitted data. Specifically, when the above-described difference image is transmitted as the depth information, a depth image is obtained by operation using the stereo images, and the actually measured depth image is reconstructed by adding the depth image to the difference image. Using the reconstructed depth image and the stereo images, the content processing device 14 performs information processing, or generates output data such as a display image and sound.

Here, the content of the output data is not particularly limited, and may be diverse depending on functions desired from the system by a user, the content of a started application, or the like. The content processing device 14, for example, connects images such that the stereo images are displayed in a left region and a right region of the display device 16, and renders a virtual object interacting with the subject on the basis of the distance value indicated by the depth image. Alternatively, a game may be made to progress by obtaining the motion of the subject in the real space from the depth image, and converting the motion of the subject in the real space into command input, and a corresponding game screen may be generated.

The display device 16 includes: a display such as a liquid crystal display, a plasma display, or an organic EL (Electroluminescence) display that outputs images; and a speaker that outputs sound. The display device 16 outputs the output data supplied from the content processing device 14 as an image and sound. The display device 16 may be a television receiver, various kinds of monitors, a display screen of a portable terminal, an electronic viewfinder of a camera, or the like, or may be a head-mounted display that is mounted on the head of the user and displays an image in front of the eyes of the user.

In general, a method of generating the depth image from the stereo images is widely known. Specifically, corresponding points of a same image in the stereo images are obtained by block matching or the like, and a distance is derived by a principle of triangulation from an amount of displacement between the corresponding points in a horizontal direction. However, with this method, correspondence between the two images is in block units, and therefore the resolution of the depth image is low. In addition, matching accuracy, or in turn the accuracy of the depth image varies greatly depending on the number of feature points on the surface of the subject.

The present embodiment is based on the usage of an actually measured depth image. The present embodiment can therefore maintain a high accuracy of information processing. In addition, a band necessary for the transmission of the depth image can be reduced by realizing data compression using the stereo images transmitted at the same time or the like. Consequently, a wide band can be used for the transmission of color stereo images, so that high-accuracy processing can be realized without a degradation in image quality.

Figure 2:
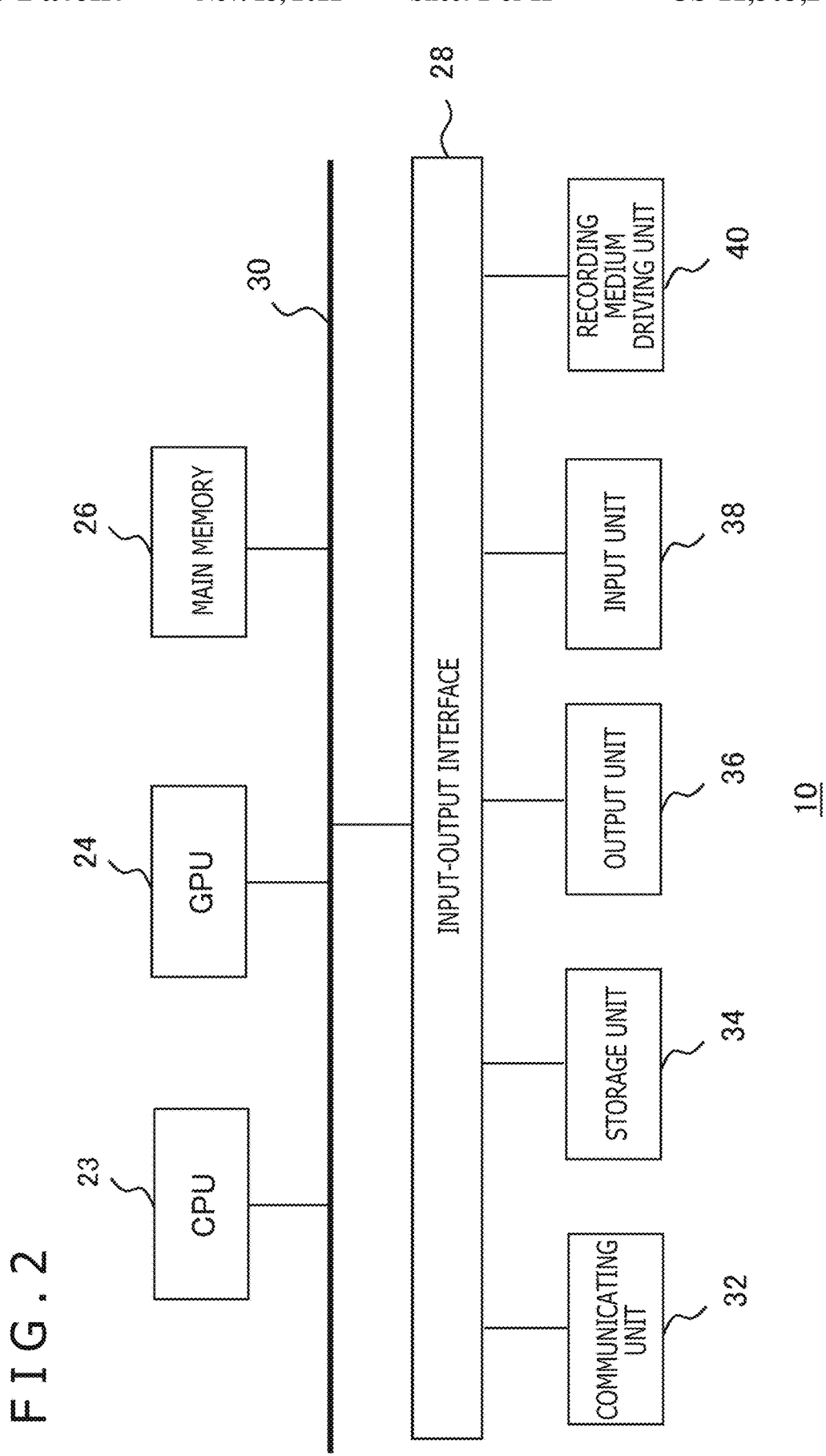
FIG. 2 is a diagram depicting an internal circuit configuration of an image processing device in the present embodiment.

FIG. 2 depicts an internal circuit configuration of the image processing device 10. The image processing device 10 includes a CPU (Central Processing Unit) 23, a GPU (Graphics Processing Unit) 24, and a main memory 26. These parts are interconnected via a bus 30. The bus 30 is further connected with an input-output interface 28. The input-output interface 28 is connected with: a communicating unit 32 including a peripheral device interface such as USB (Universal Serial Bus) or IEEE (Institute of Electrical and Electronics Engineers) 1394, and a network interface of a wired or wireless LAN; a storage unit 34 such as a hard disk drive and a nonvolatile memory; an output unit 36 that outputs data to an external apparatus; an input unit 38 that inputs data from the imaging device 12 and an input device not depicted in the figure; and a recording medium driving unit 40 that drives a removable recording medium such as a magnetic disk, an optical disk, or a semiconductor memory.

The CPU 23 controls the whole of the image processing device 10 by executing an operating system stored in the storage unit 34. The CPU 23 also executes various kinds of programs read from the removable recording medium and loaded into the main memory 26 or downloaded via the communicating unit 32. The GPU 24 has functions of a geometry engine and functions of a rendering processor. The GPU 24 performs rendering processing according to a rendering instruction from the CPU 23, and performs output to the output unit 36. The main memory 26 is formed by a RAM (Random Access Memory). The main memory 26 stores a program and data necessary for processing. Incidentally, an internal circuit configuration of the content processing device 14 may be similar to this internal circuit configuration.

Figure 3:
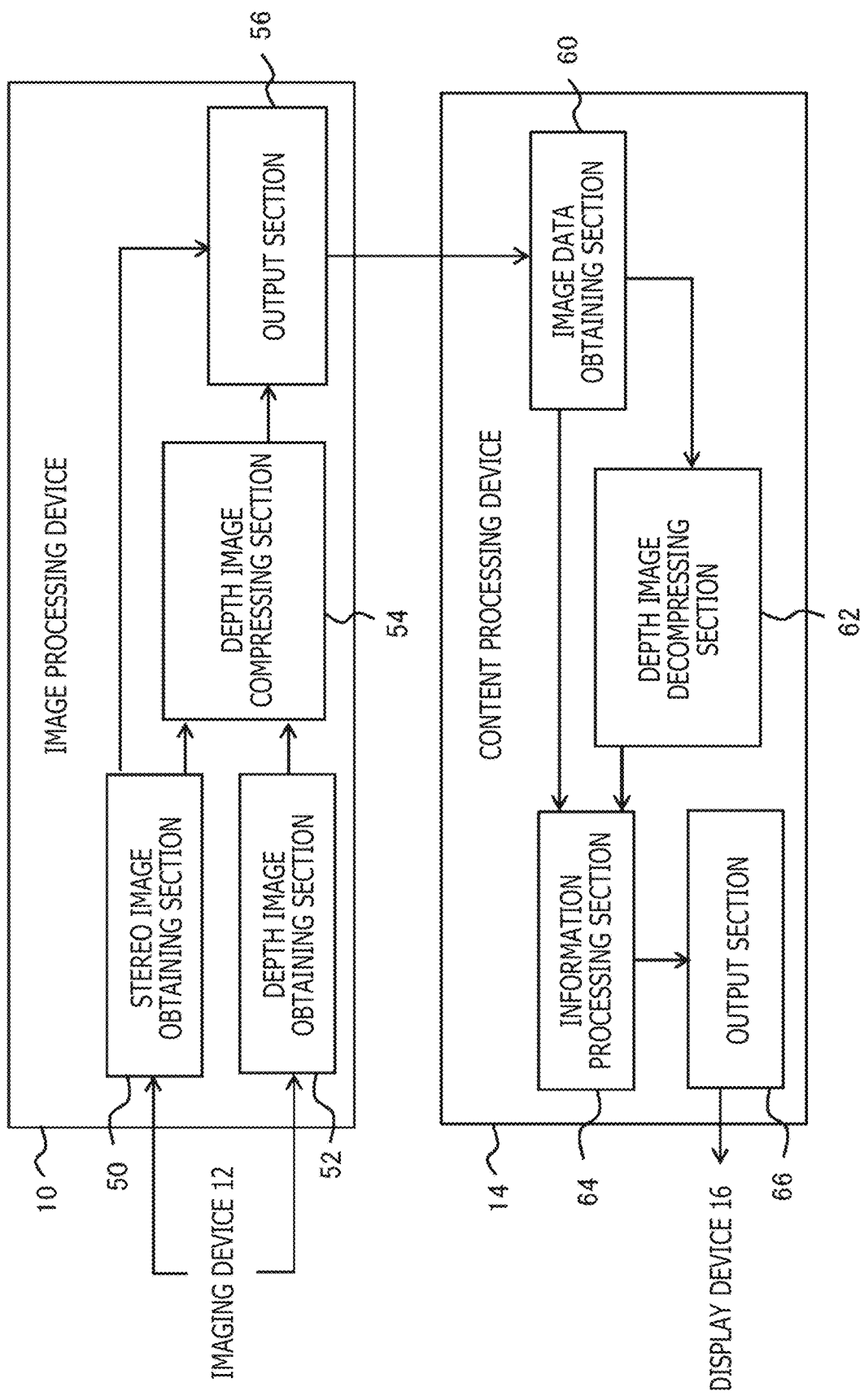
FIG. 3 is a diagram depicting a configuration of functional blocks of the image processing device and a content processing device in the present embodiment.

FIG. 3 depicts a configuration of functional blocks of the image processing device 10 and the content processing device 14. Each of the functional blocks depicted in the figure can be implemented by the various circuits depicted in FIG. 2 in terms of hardware, and is implemented by a program that is loaded from a recording medium to the main memory and exerts various functions such as an image analyzing function, an information processing function, an image rendering function, and a data input-output function in terms of software. Hence, it is to be understood by those skilled in the art that these functional blocks can be implemented in various forms by only hardware, only software, or combinations of hardware and software, and are not to be limited to one of the forms.

The image processing device 10 includes: a stereo image obtaining section 50 that obtains the data of stereo images from the imaging device 12; a depth image obtaining section 52 that obtains the data of a depth image; a depth image compressing section 54 that compresses the data of the depth image using the stereo images; and an output section 56 that outputs the data of the stereo images and the depth image after being compressed. Both the stereo image obtaining section 50 and the depth image obtaining section 52 are implemented by the input unit 38, the CPU 23, the main memory 26, and the like in FIG. 2. The former sequentially obtains the data of the stereo images from the imaging device 12 at the predetermined frame rate. The latter sequentially obtains the data of the depth image from the imaging device 12 at the predetermined frame rate. Here, the stereo image obtaining section 50 constitutes a photographed image obtaining section that obtains the data of a plurality of photographed images formed by photographing a subject from different viewpoints.

The stereo image obtaining section 50 and the depth image obtaining section 52 may each obtain the data in a stream format in order from a row in which exposure is completed in the imaging device 12. The depth image compressing section 54 is implemented by the CPU 23, the GPU 24, the main memory 26, and the like in FIG. 2. The depth image compressing section 54 compresses the data size of the depth image. Specifically, as described above, a difference image between a depth image obtained from operation using the stereo images and a depth image obtained by the depth image obtaining section 52 is generated. Alternatively, the depth image compressing section 54 may change the number of gradations per unit distance for data indicating a distance value according to a distance to a subject, and perform quantization.

At this time, the depth image compressing section 54 may extract an image of a subject in one of the stereo images, and allocate, to each subject, an appropriate number of gradations corresponding to the distance range of the subject. In addition, the depth image compressing section 54 may apply the adjustment of the number of gradations according to distance to the difference image between the depth image obtained by operation using the stereo images and the actually measured depth image. The difference image, the image resulting from the adjustment of the number of gradations per unit distance, and accompanying data will hereinafter be referred to collectively as a "depth image after being compressed."

The output section 56 is implemented by the CPU 23, the main memory 26, the communicating unit 32, and the like in FIG. 2. The output section 56 outputs the data of the stereo images obtained by the stereo image obtaining section 50 and the data of the depth image after being compressed that is generated by the depth image compressing section 54. An output destination may be the content processing device 14, or may be a recording medium readable by the content processing device 14. Alternatively, the data of the stereo images obtained by the stereo image obtaining section 50 and the data of the depth image after being compressed that is generated by the depth image compressing section 54 may be stored in the storage unit 34 of the image processing device 10 in advance, and transmitted in response to a request from the content processing device 14. Incidentally, the output section 56 may compression-code or packetize the output target data by an ordinary method.

The content processing device 14 includes: an image data obtaining section 60 that obtains the data of the stereo images and the depth image after being compressed; a depth image decompressing section 62 that decompresses the depth image after being compressed; an information processing section 64 that performs predetermined information processing using the data of the stereo images and the depth image; and an output section 66 that outputs the data of a display image and sound generated as a result of the information processing.

The image data obtaining section 60 is implemented by the communicating unit 32, the CPU 23, the main memory 26, and the like in FIG. 2. The image data obtaining section 60 sequentially obtains the data of the stereo images and the depth image after being compressed from the image processing device 10 at the predetermined frame rate. In a case where the data of the stereo images and the depth image after being compressed is obtained via a recording medium, the image data obtaining section 60 sequentially reads these pieces of image data by the recording medium driving unit 40. Also in the case of using a recording medium, the present embodiment can reduce the size of the stored data. Incidentally, in a case where the obtained data of the images is compression-coded by an ordinary method, the image data obtaining section 60 restores the data into two-dimensional image data by decoding the data.

The depth image decompressing section 62 is implemented by the CPU 23, the GPU 24, the main memory 26, and the like in FIG. 2. The depth image decompressing section 62 generates the original depth image by decompressing the depth image after being compressed. The content of the decompression processing is basically processing that reversely traces the compression processing performed by the depth image compressing section 54 in the image processing device 10. A concrete example thereof will be described later.

The information processing section 64 is implemented by the CPU 23, the GPU 24, the main memory 26, and the like in FIG. 2. The information processing section 64 generates output data by performing predetermined information processing using the stereo images and the depth image after being decompressed. As described above, the content of the processing performed by the information processing section 64 is not particularly limited. The output section 66 is implemented by the CPU 23, the main memory 26, the output unit 36, and the like in FIG. 2. The output section 66 outputs the thus generated output data of a display image and the like to the display device 16. Incidentally, the depth image decompressing section 62 of the content processing device 14 may be formed as an image data decompressing device independent of the device that performs processing related to a game and display.

Figure 4:
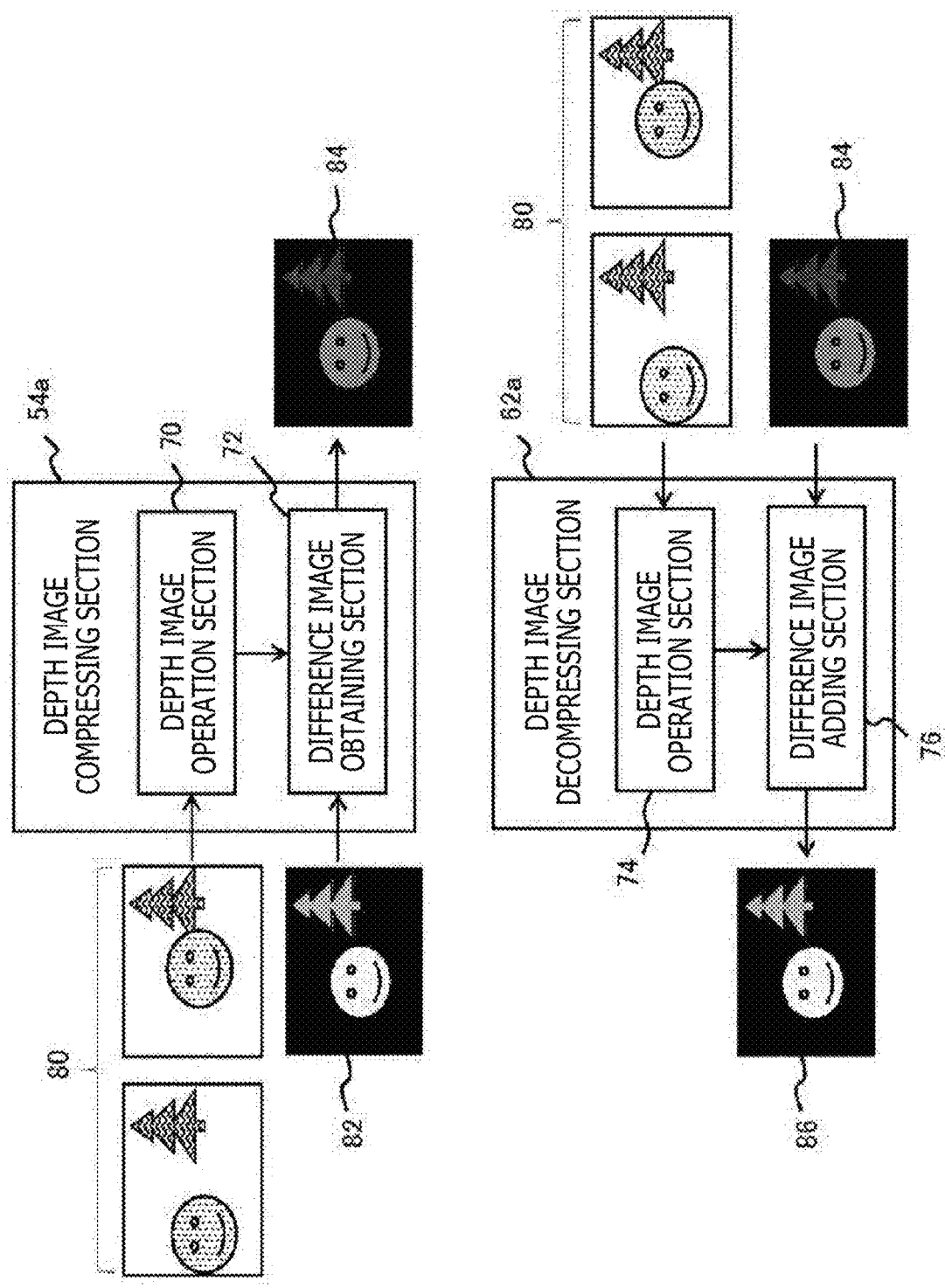
FIG. 4 is a diagram depicting a configuration of functional blocks of a depth image compressing section and a depth image decompressing section and a flow of processing in a case of using a difference image between a depth image obtained from operation using stereo images and a depth image actually measured by a depth camera in the present embodiment.

The depth image compressing method/decompressing method in the present embodiment will next be described in detail. FIG. 4 depicts a configuration of functional blocks of the depth image compressing section 54 and the depth image decompressing section 62 and a flow of processing in a case of using a difference image between a depth image obtained from operation using stereo images and a depth image actually measured by the depth camera as one mode of the present embodiment. A depth image compressing section 54a in the image processing device 10 in this case includes a depth image operation section 70 and a difference image obtaining section 72. The depth image operation section 70 sets stereo images 80 as input data, and generates a depth image by operation.

Specifically, as described above, corresponding points in the two stereo images are identified by stereo matching, and a distance to a subject is derived from a parallax between the stereo images by a principle of triangulation. At this time, typically, a reference block is set to one of the stereo images, and a search is made for a block having a high degree of similarity in the other image in the horizontal direction. A distance value is calculated on the basis of a resulting parallax, and mapped to the image in which the reference block is set. A depth image at a corresponding viewpoint is thereby generated.

The difference image obtaining section 72 sets, as input data, a depth image 82 photographed by the depth camera and the depth image generated by the depth image operation section 70, and generates a difference image 84 indicating differences between the pixel values of the two depth images. In actuality, the difference image obtaining section 72 can be implemented by a circuit similar to a circuit that obtains differences between frames of a moving image, the circuit being used for a technology of conventional differential pulse-code modulation (DPCM). The same is true for difference image obtaining sections 72 in the following figures. The image processing device 10 outputs the thus generated difference image 84 as a depth image after being compressed together with the data of the stereo images 80.

On the other hand, a depth image decompressing section 62a of the content processing device 14 includes a depth image operation section 74 and a difference image adding section 76. The depth image operation section 74 sets the stereo images 80 as input data, and generates a depth image by operation. This processing is similar to processing performed by the depth image operation section 70 in the depth image compressing section 54a of the image processing device 10. The difference image adding section 76 sets, as input data, the difference image 84 as the depth image after being compressed and the depth image generated by the depth image operation section 74, and generates a depth image 86 equal to the depth image 82 actually measured by the imaging device 12 by adding together the pixel values of the two images. In actuality, the difference image adding section 76 can be implemented by a circuit similar to a circuit that decodes the frames of the moving image in the above-described differential pulse-code modulation. The same is true for difference image adding sections 76 in the following figures.

The depth images generated by the depth image operation sections 70 and 74 by the above-described method generally have a lower resolution than the stereo images used for the operation, and tend to vary in accuracy depending on the number of feature points on the surface of the subject. The difference image 84 from the depth image 82 actually measured by the depth camera compensates for such decreases in resolution and accuracy. As a result, by setting the difference image 84 as a transmission target, it is possible to transmit information equal to the depth image 82 with a data size smaller than the actually measured depth image 82.

Incidentally, while all of the images are depicted in a same size in the figure, the size and resolution of the stereo images 80, the depth image 82, and the difference image 84 may be set independently. In a case where the images used for the generation and addition of the difference image are different in size (resolution), it suffices to enlarge or reduce the images as appropriate by an existing interpolation technology, and thereafter subject pixels at same positions to operation. In addition, in the imaging device 12, the depth camera may also be constituted by stereo cameras, and thereby the actually measured depth image 82 may be stereo images from the left and right viewpoints.

In this case, differences between the one depth image generated by the depth image operation section 70 by operation and each of the depth images from the left and right viewpoints may be calculated, and thereby the difference image 84 may also be stereo images from the left and right viewpoints. That is, the depth image compressing section 54a generates the difference image 84 for each of a plurality of the depth images. When the depth images from the left and right viewpoints are actually measured, even in the case of a part in a blind spot from one viewpoint, a distance to the part from the other viewpoint is identified. Thus, high-accuracy information processing can be performed by using distance information in a wider range of a real world. Even in such a mode, an increase in the size of transmission data can be suppressed when both of the depth images are compressed into difference images.

Alternatively, two depth images corresponding to the two actually measured depth images may be generated by shifting an image of each subject in the one depth image generated by the depth image operation section 70 by operation such that the image of each subject is viewed from the left and right viewpoints of depth cameras. That is, the depth image compressing section 54a converts the one depth image based on parallax into two depth images from the viewpoints when the compression target depth image is actually measured, and then generates differences from the compression target depth image. In this case, difference stereo images can be generated by subjecting the depth images from the corresponding viewpoints to operation.

A method of shifting the image in the depth image thus obtained by operation such that the image is viewed from the viewpoints of depth cameras is applicable irrespective of the number and positions of depth cameras when the positional relation between the stereo cameras and the depth cameras is known. This processing reduces differences between the actually measured depth image and the depth images obtained by operation, and can therefore reduce the data size more. An ordinary computer graphics technology can be applied to a method of generating images from different viewpoints on the basis of subject distance information.

Figure 5:
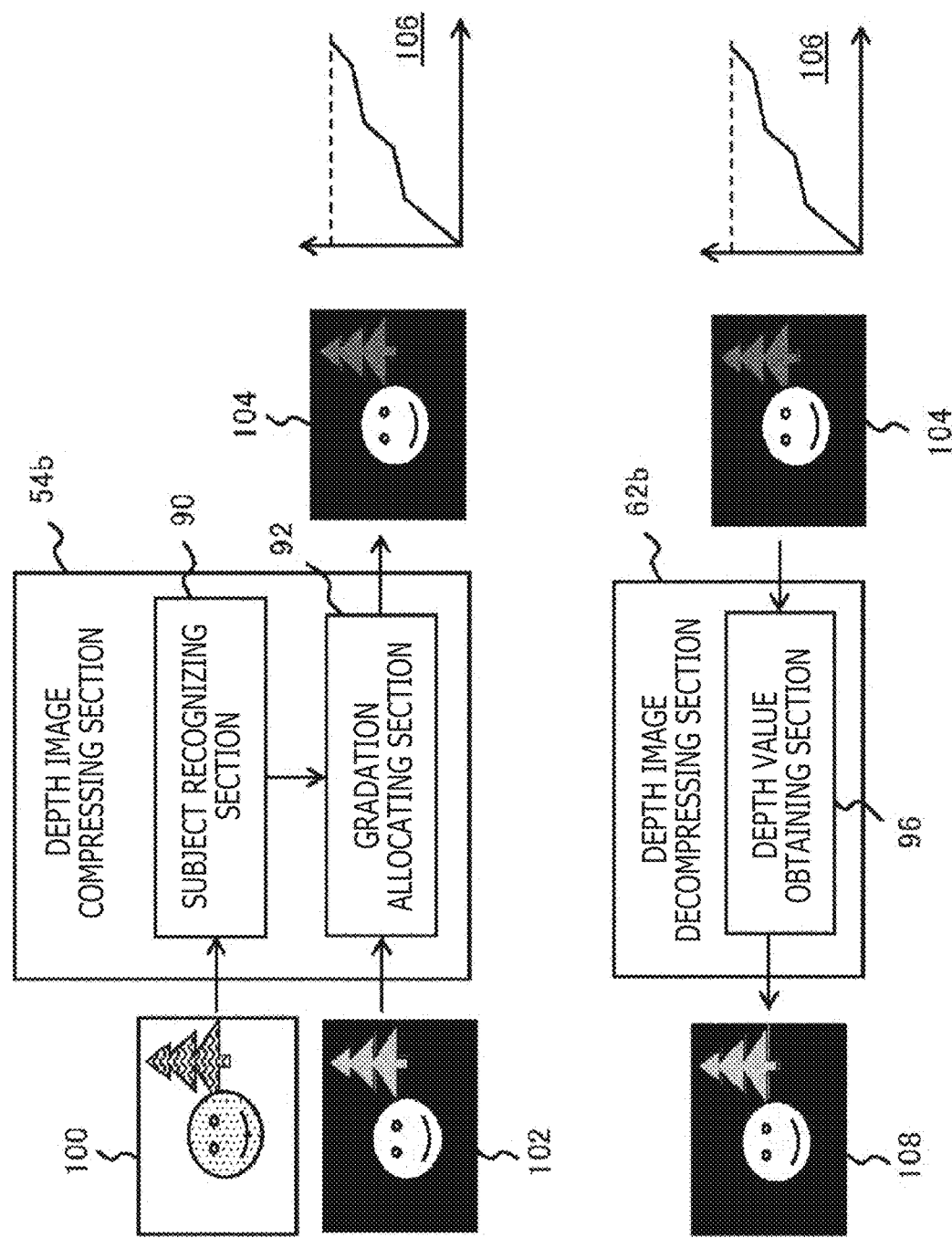
FIG. 5 is a diagram depicting a configuration of functional blocks of the depth image compressing section and the depth image decompressing section and a flow of processing in a case where the number of gradations of distance values as pixel values of a depth image is changed according to the distances of subjects in the present embodiment.

FIG. 5 depicts a configuration of functional blocks of the depth image compressing section 54 and the depth image decompressing section 62 and a flow of processing in a case where the number of gradations of distance values as the pixel values of the depth image is changed according to the distances of subjects as another mode of the present embodiment. A depth image compressing section 54b in the image processing device 10 in this case includes a subject recognizing section 90 and a gradation allocating section 92. The subject recognizing section 90 recognizes a subject appearing as an image by using at least one image 100 of the stereo images.

The subject recognizing section 90, for example, identifies a region of an image of a subject by extracting a contour line in the image 100 using an edge extracting filter. In the illustrated example, a face, a tree, and another background region are identified from the image 100. Various other methods are also proposed as a segmentation technology that separates a region of an image of a subject in an image, and any of the methods may be adopted in the present embodiment. For example, a face recognition technology may be introduced for a region of a face, and template matching may be introduced for a subject of a known shape. Alternatively, object tracking from a previous image frame may be performed by using a method such as an optical flow.

Depending on the adopted recognizing method, both an actually measured depth image 102 and stereo images may be used as appropriate. Incidentally, as described above, subject recognition by the subject recognizing section 90 has an objective of allocating numbers of gradations of pixel values in the depth image according to distance. It is therefore not necessary to separate images of all of subjects precisely. For example, in a case where a plurality of subjects are in contact with each other, the plurality of subjects may not be distinguished from each other.

The gradation allocating section 92 determines the number of gradations per unit distance of a distance value expressed as a pixel value of the depth image for each subject on the basis of the depth image 102 photographed by the depth camera and a region of an image of each subject recognized by the subject recognizing section 90. In information processing using depth information, the closer to the imaging device a subject is, the higher the accuracy of the depth information is desired. That is, even in the case of a same amount of movement in a real world, the amount of movement in an image is increased as distance to the imaging device is decreased. In addition, in an ordinary environment, a main target such as a user is highly likely to be present closer to the imaging device than other subjects.

In order to reflect conditions in such a real world in information processing accurately, it is desirable to increase the resolution of distance information for a near subject. In other words, reducing the resolution of distance information for a distant subject has a small effect on the accuracy of the information processing. Hence, the gradation allocating section 92 assigns a larger number of gradations to a nearer subject, and quantizes the pixel values in the depth image 102. For example, with respect to a bit depth indicating a pixel value in the depth image, numbers of bits are allocated at a ratio such that 50 percent are assigned to the pixel values of an image of the face, 30 percent are assigned to the pixel values of the tree in the rear, and 20 percent are assigned to other parts. Such an allocation naturally changes depending on the number of subjects different in distance.

It is thereby possible to provide distance information with a high resolution for a subject at a short distance, which subject is important in information processing in a subsequent stage, without increasing the data size of the whole of the depth image. The gradation allocating section 92 sets, as the data of the depth image after being compressed, a depth image 104 quantized after an appropriate number of gradations is assigned to each object and correspondence information 106 for pixel values before and after the quantization. The image processing device 10 outputs the data of the depth image after being compressed and the data of the stereo images.

On the other hand, a depth image decompressing section 62b of the content processing device 14 includes a depth value obtaining section 96. The depth value obtaining section 96 sets, as input data, the data of the depth image after being compressed, that is, the depth image 104 in which the number of gradations is adjusted according to distance and the correspondence information 106 for the pixel values before and after the quantization, and reconstructs an original depth image 108. That is, the data of the pixel values different in resolution according to distance, the pixel values being expressed in the depth image 104 transmitted from the image processing device 10, is converted into data with a uniform resolution. The correspondence information 106 for the pixel values before and after the quantization is used for the conversion.

FIG. 6 depicts diagrams of assistance in explaining the correspondence information for the pixel values before and after the quantization, the correspondence information being used to decompress the depth image. An example depicted in (a) indicates changes in distance after the quantization with respect to the actually measured distance in a case where numbers of gradations are allocated on the basis of the distances of the recognized subjects as described above. Incidentally, to be exact, the values after the quantization are discrete, but are schematically depicted as a continuous value in the figure. In addition, the graph is not intended to limit the format of the correspondence information. That is, in the content processing device 14, the data format is not limited, and may be a function, a look-up table, or the like as long as the values before the quantization can be obtained from the values after the quantization.

An ordinary technology determines a distance after the quantization such that the distance after the quantization is directly proportional to the value of an actually measured distance, as in a change 180 indicated by alternate long and short dashed lines in (a). On the other hand, as in a change 182 indicated by a solid line, the present embodiment assigns many gradations to distance ranges in which the subjects are present, and assigns more gradations as distance from the imaging device 12 is decreased.

For example, in an image composition depicted in FIG. 5, numbers of gradations A, B, and C are respectively assigned to the distance range of the face located closest to the imaging device side, the distance range of the tree in the rear of the face, and the distance range of a wall or the like located in a rearmost position such that A>B>C. In addition, a predetermined smaller number of gradations than the number of gradations C is assigned to a distance range between subjects (distance range in which no subject is present). This is due to low importance of steps of distance between subjects as compared with unevenness on the surface of the subjects and the distance between the subjects.

Incidentally, a "distance range" may be a range of distances actually appearing as pixel values in an image of a subject in the depth image, or may be set in advance for each kind of subject in consideration of thickness or the like. For example, in a case where the subject recognizing section 90 performs face recognition, a setting may be made using typical data related to the depth of projections and depressions on the surface of a face or the thickness of a head. Alternatively, the occurrence of a movement and an error may be able to be accommodated within the range by increasing the distance range as the distance is decreased. A ratio between the numbers of gradations A, B, and C is, for example, determined by a reciprocal of an average distance of each subject. However, the distance ranges of the subjects and the rule for determining the numbers of gradations to be allocated are not limited to this.

In any case, even when the bit depth of the pixel values in the depth image is reduced from a typical value D to D', the number of gradations given to an important subject can be increased. When the gradation allocating section 92 of the image processing device 10 determines the numbers of gradations A, B, and C to be assigned according to a result of recognition of the subjects and the distance ranges, the gradation allocating section 92 can generate information that uniquely associates the distance values before and after the quantization as depicted in the figure. The depth value obtaining section 96 of the content processing device 14 can generate an image equal to the original depth image by referring to the information, and obtaining actually measured distances from the distances after the quantization, the distances after the quantization being indicated by the transmitted depth image.

(b) of FIG. 6 represents, as a modification of (a), an example of a change in distance after the quantization with respect to the actually measured distance in a case where the change is fixed irrespective of the presence of the subjects and the distances of the subjects. Also in this case, qualitatively, more gradations are assigned as the distance is decreased, but application is possible irrespective of the positions and number of the subjects by changing the distance after the quantization in a curved manner with respect to the actually measured distance. This may equally assign many gradations even when there is no subject in the vicinity of the imaging device. However, the processing of the subject recognizing section 90 can be omitted. Hence, depending on a photographing environment and the content of information processing as in a game in which the user is often present immediately in front of the imaging device or the like, an increase in speed of the processing can be achieved while accuracy is maintained.

Figure 7:
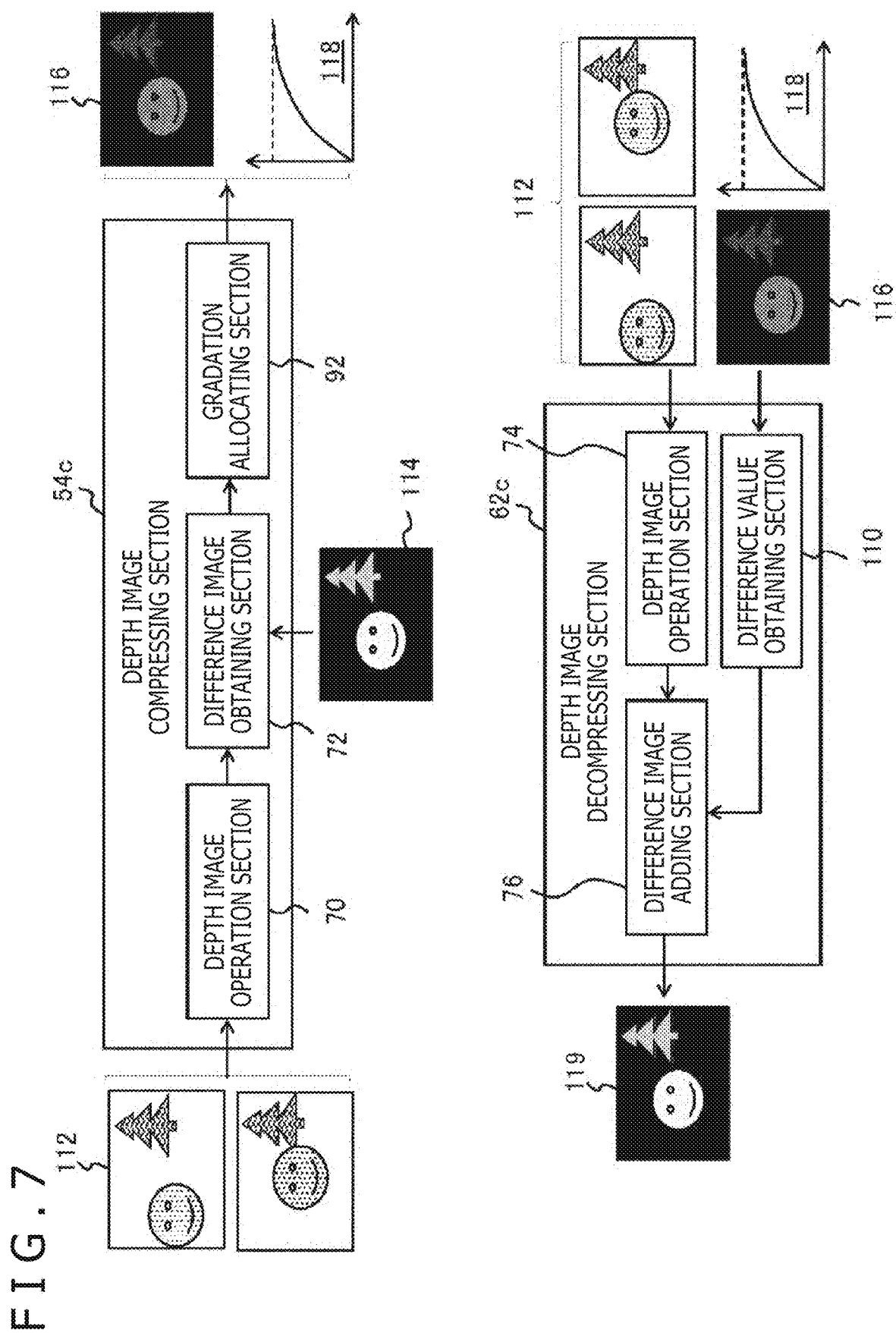
FIG. 7 is a diagram depicting a configuration of functional blocks of the depth image compressing section and the depth image decompressing section and a flow of processing in a case where the number of gradations of the pixel values of the difference image depicted in FIG. 4 is adjusted as depicted in FIG. 5.

FIG. 7 depicts a configuration of functional blocks of the depth image compressing section 54 and the depth image decompressing section 62 and a flow of processing in a case where the number of gradations of the pixel values of the difference image depicted in FIG. 4 is adjusted as depicted in FIG. 5 as yet another mode of the present embodiment. A depth image compressing section 54c in the image processing device 10 in this case includes a depth image operation section 70, a difference image obtaining section 72, and a gradation allocating section 92. The depth image operation section 70 and the difference image obtaining section 72 have the same functions as the depth image operation section 70 and the difference image obtaining section 72 depicted in FIG. 4.

Specifically, the depth image operation section 70 obtains a depth image from stereo images 112 by operation, and the difference image obtaining section 72 generates a difference image between an actually measured depth image 114 and the depth image obtained by operation. The gradation allocating section 92 has functions similar to those of the gradation allocating section 92 depicted in FIG. 5. However, the gradation allocating section 92 sets the difference image generated by the difference image obtaining section 72 as a processing target. Also in the case of differences between the actually measured depth image and the depth image obtained from the stereo images by performing operation, the closer to the imaging device 12 the distance of a subject is, the more the accuracy thereof tends to affect the accuracy of information processing.

Therefore, by assigning a larger number of gradations to a subject at a shorter distance also in the difference image, it is possible to improve processing accuracy for a main subject, and decrease the bit depth of the pixel values and further compress the data size of the difference image. The image processing device 10 outputs a difference image 116 in which gradations are adjusted and correspondence information 118 of pixel values before and after quantization as the data of the depth image after being compressed together with the data of the stereo images 112.

On the other hand, a depth image decompressing section 62c of the content processing device 14 includes a depth image operation section 74, a difference value obtaining section 110, and a difference image adding section 76. The depth image operation section 74 and the difference image adding section 76 have the same functions as the depth image operation section 74 and the difference image adding section 76 depicted in FIG. 4. Specifically, the depth image operation section 74 obtains a depth image from the stereo images 112 by operation, and the difference image adding section 76 generates an original depth image 119 by adding together the depth image and the difference image.

The difference value obtaining section 110 has functions similar to those of the depth value obtaining section 96 depicted in FIG. 5. However, the difference value obtaining section 110 sets the difference image in which the number of gradations per unit difference is adjusted as a processing target. Specifically, the correspondence information 118 of the pixel values before and after the quantization is referred to, and an actual difference value is obtained for each pixel from a difference value after the quantization which difference value is indicated by the difference image 116. An original depth image 119 can be generated in a similar manner to that depicted in FIG. 4 by inputting the thus reconstructed difference image to the difference image adding section 76. Incidentally, while the correspondence information 118 of the pixel values before and after the quantization is in the mode depicted in (b) of FIG. 6 in the example depicted in FIG. 7, the correspondence information 118 may of course be in the mode depicted in (a) of FIG. 6. In this case, it suffices to provide the subject recognizing section 90 to the depth image compressing section 54c.

Figure 8:
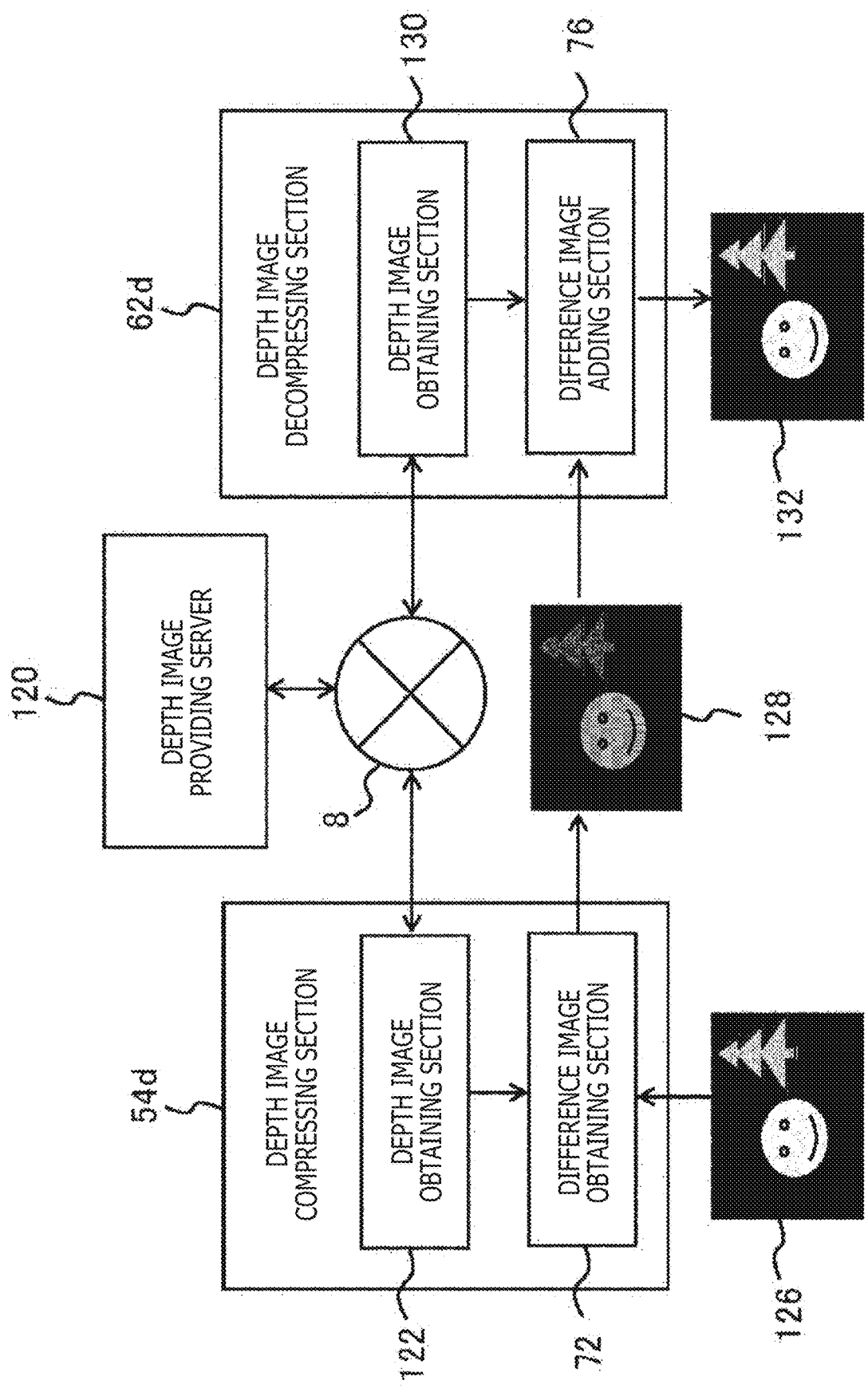
FIG. 8 is a diagram depicting functional blocks in a case where the depth image compressing section and the depth image decompressing section in the present embodiment compress/decompress a depth image by using data that can be obtained from a server.

A part of functions of the depth image compressing section 54 and the depth image decompressing section 62 illustrated thus far may be performed by another device connected via a network. FIG. 8 depicts functional blocks in a case where the depth image compressing section 54 and the depth image decompressing section 62 compress/decompress a depth image by using data that can be obtained from a server. In this mode, a depth image providing server 120 is connected to a network 8. The depth image providing server 120 has a function of generating a depth image corresponding to a photographed image transmitted via the network from the photographed image, and returning the depth image.

A technology of deep machine learning (deep learning) has recently been coming into practical use as machine learning using a neural network. A depth image can also be estimated from one photographed image when the technology is introduced, and when associations of characteristics in photographed images such as the attributes, colors, and changes in the colors of subjects, and the shapes, sizes, and screen compositions of images with depth information are made to be learned on the basis of a large amount of photographed images. By such a function, the depth image providing server 120 generates a depth image on the basis of a photographed image transmitted from the image processing device 10 and the content processing device 14, and returns the depth image to the transmission sources.

In this case, stereo images are not essential in generating a difference image and reconstructing the depth image. The imaging device 12 can therefore be formed by a monocular color image photographing camera and a depth camera in some cases. However, this does not apply in a case where stereo images are used for display. A depth image compressing section 54d of the image processing device 10 includes a depth image obtaining section 122 and a difference image obtaining section 72. The depth image obtaining section 122 transmits the data of a photographed image obtained from the imaging device 12 to the depth image providing server 120, and obtains a depth image returned in response to the transmission of the data.

The difference image obtaining section 72 has the same functions as the difference image obtaining section 72 depicted in FIG. 4. The difference image obtaining section 72 generates a difference image 128 between an actually measured depth image 126 and the depth image transmitted from the depth image providing server 120. Incidentally, also in this mode, the gradation allocating section 92 depicted in FIG. 7 may be introduced to adjust the number of gradations of the difference image according to the distances of subjects. The image processing device 10 outputs the data of the depth image after being compressed and the data of the color photographed image.

A depth image decompressing section 62d of the content processing device 14 includes a depth image obtaining section 130 and a difference image adding section 76. The depth image obtaining section 130 transmits the data of the color photographed image to the depth image providing server 120, and obtains the depth image returned in response to the transmission of the data. The difference image adding section 76 has the same functions as the difference image adding section 76 depicted in FIG. 4. Specifically, the difference image adding section 76 generates an original depth image 132 by adding together the depth image transmitted from the depth image providing server 120 and the difference image 128 transmitted from the image processing device 10. Incidentally, when the number of gradations is adjusted according to the distances of the subjects in the image processing device 10, the functions of the difference value obtaining section 110 depicted in FIG. 7 are introduced into the depth image decompressing section 62d.

Figure 9:
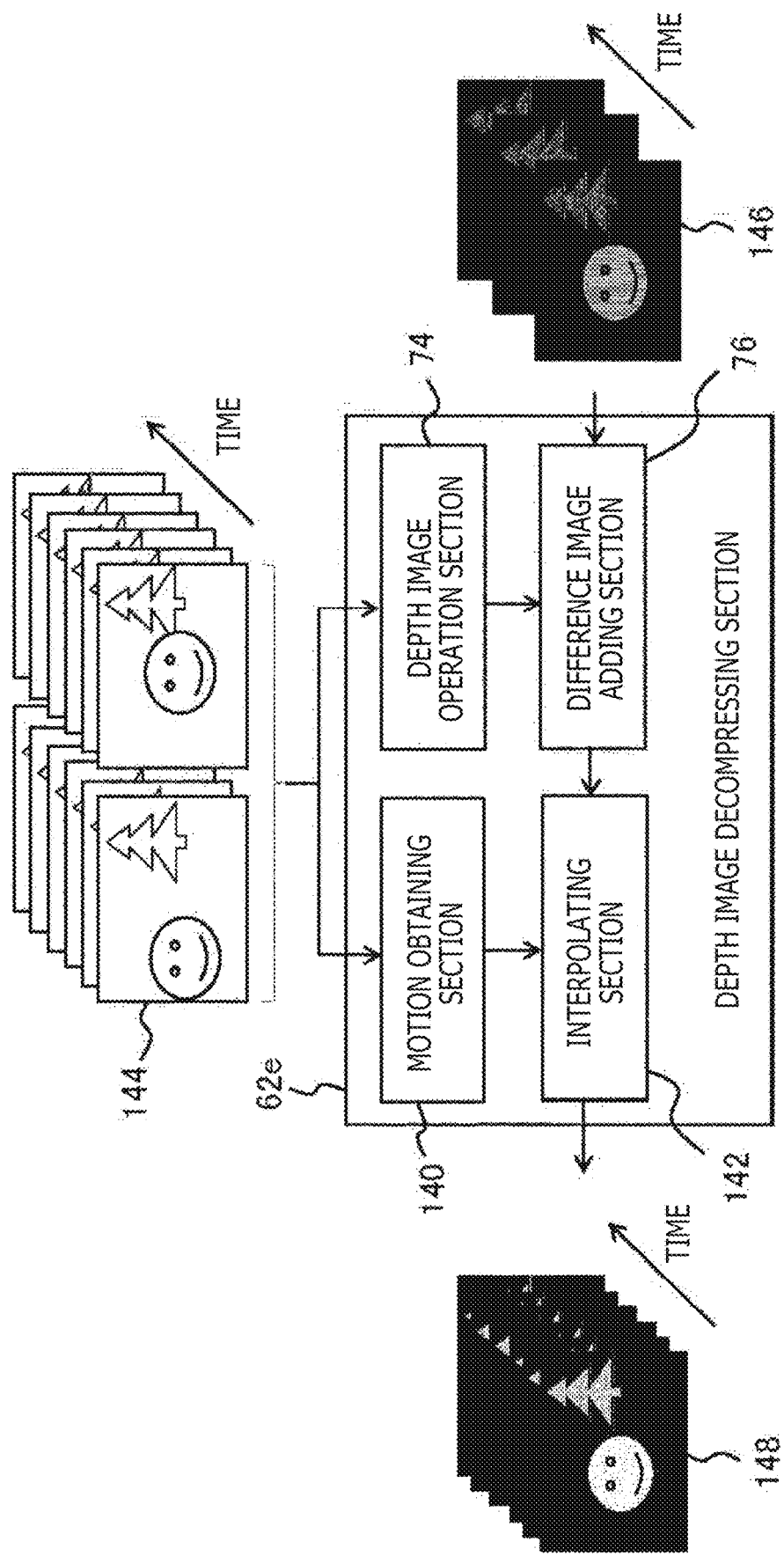
FIG. 9 is a diagram depicting a configuration of functional blocks of the depth image decompressing section in the content processing device and a flow of processing in a mode in which the frame rate of a depth image is made lower than that of stereo images in the present embodiment.

The modes described thus far basically obtain and transmit the stereo images and the depth image at the same frame rate. However, the size of the transmission data may be further compressed by decreasing the frame rate of the depth image. FIG. 9 depicts a configuration of functional blocks of the depth image decompressing section 62 in the content processing device 14 and a flow of processing in a mode in which the frame rate of the depth image is made lower than that of the stereo images.

In this mode, the image processing device 10 transmits the data of the stereo images to the content processing device 14 at a predetermined frame rate, and transmits the data of the compressed depth image to the content processing device 14 at a frame rate lower than the predetermined frame rate. In the figure, the difference image from the computed depth image is assumed as the data of the compressed depth image. However, the data of the compressed depth image may be data in which the number of gradations of the depth image or the difference image is adjusted according to the distances of subjects. A depth image decompressing section 62e includes a depth image operation section 74, a difference image adding section 76, a motion obtaining section 140, and an interpolating section 142.

The depth image operation section 74 and the difference image adding section 76 have the same functions as the depth image operation section 74 and the difference image adding section 76 depicted in FIG. 4. Specifically, the depth image operation section 74 obtains a depth image from stereo images 144 by operation, and the difference image adding section 76 generates an original depth image by adding together the depth image and a difference image 146. However, it suffices for the depth image operation section 74 to obtain the depth image only for image frames at times corresponding to the difference image 146. For example, in a case where the frame rate of the difference image 146 is set to be ½ of that of the stereo images, the depth image operation section 74 obtains the depth image using the stereo images in every other frame.

Then, by addition to the difference image 146, the difference image adding section 76 can obtain the original depth image at the same frame rate as the difference image 146. Meanwhile, the motion obtaining section 140 obtains a motion vector of a subject by taking an inter-frame difference of one of the stereo images 144. A method of obtaining the motion vector of the subject in the moving image is an ordinary technology. Then, the interpolating section 142 interpolates a depth image on a time axis by predicting a motion until a next time step using the past motion vector, and then applying the motion to the depth image at the lower frame rate, the depth image being generated by the difference image adding section 76.

For example, in the case where the frame rate of the difference image 146 is set to be ½ of that of the stereo images, one depth image frame to which a predicted motion for a time $\Delta t/2$ is given is generated and inserted between frames of a time $\Delta t$ of the depth image reconstructed by the difference image adding section 76. It is thereby possible to generate a depth image 148 with high accuracy at the same frame rate as the stereo images 144 while the size of the transmitted data is further reduced.

In addition, because the frame rates of the stereo images and the depth image can be set independently of each other, an optimum frame rate for each of the images can be selected in consideration of also differences in photographing principles of the cameras photographing the respective images, and the image quality of both images can be improved. Incidentally, in a case where the photographing timings of the stereo images and the depth image do not coincide with each other due to the independently set frame rates, the stereo images photographed in timing closest to the photographing timing of the depth image may be used to generate the difference image and reconstruct the depth image.

On the other hand, the depth image operation section 74 may generate the depth image for all of image frames of the stereo images 144 with an objective of obtaining the motion vector. That is, the motion obtaining section 140 obtains the motion vector by taking the inter-frame difference of the depth image obtained by operation in place of the stereo images. Also in this case, the processing of the interpolating section 142 is similar to that described above.

According to the present embodiment described above, in the system in which information processing is performed by using the photographed stereo images and the photographed depth image, the image processing device that sends out data compresses the data of the actually measured depth image by using a depth image obtained from the stereo images by operation. Obtaining the compressed data, the content processing device reconstructs the actually measured depth image by using the depth image obtained from the stereo images by operation. The depth image obtained by operation and the actually measured depth image have a high similarity to each other. Thus, the difference image between the image obtained by operation and the actually measured depth image can be expressed by a significantly smaller number of gradations than original pixel values. By setting such data as a transmission target, it is possible to realize high-accuracy information processing based on the actually measured depth image while using a limited transmission band.

In addition, the number of gradations indicating the pixel values of the depth image or the difference image is adjusted according to the distances of subjects depicted in the actually measured depth image. It is thereby possible to transmit distance information with a high resolution for a subject at a short distance, which subject is important in information processing and tends to affect accuracy, without increasing the bit depth. Further, the size of the transmission data can be made smaller by transmitting the compressed depth image at a frame rate lower than that of the stereo images, and performing interpolation by motion compensation using the stereo images in a stage in which the compressed depth image is used in information processing.

From the above, it is possible to preferentially allocate a transmission band to important data such as the data of the color images used for display and the distance information of a main subject, and thus stably realize high-accuracy information processing and image display irrespective of a communication state.

The present invention has been described above on the basis of embodiment thereof. The foregoing embodiment is illustrative, and it is to be understood by those skilled in the art that combinations of constituent elements and processing processes of the embodiment are susceptible of various modifications, and that such modifications also fall within the scope of the present invention.

Figure 10:
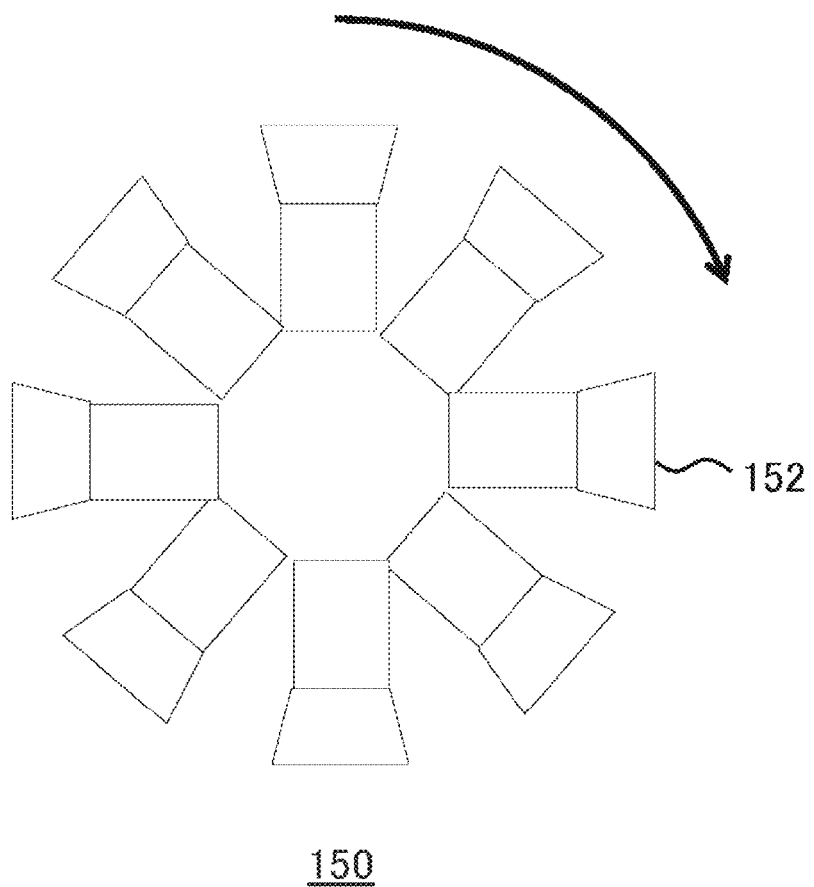
FIG. 10 is a diagram schematically depicting a bird's-eye view of an imaging device in a modification.

For example, in the present embodiment, the imaging device 12 has a configuration including a pair of stereo cameras and a depth camera. However, the configuration of the imaging device is not limited as long as the stereo images and the depth image can be photographed in the same timing. In addition, the images photographed together with the depth image are not limited to the stereo images and color images as long as the depth image can be generated at least by operation. A modification of the imaging device will be described in the following. FIG. 10 schematically depicts a bird's-eye view of an imaging device in the modification.

An imaging device 150 in the illustrated example has a configuration obtained by annularly connecting a plurality of video cameras (for example, video cameras 152) so as to make optical axes radial in a horizontal plane parallel with the figure. At a time of operation, the imaging device 150 is rotated in a predetermined direction (for example, the direction of an arrow) on the horizontal plane with the center of the ring as an axis. Incidentally, the figure does not depict a driving mechanism for the rotation. With such a configuration, every subject present over 360° on the periphery at each time can be included within a field of view of one of the cameras, and even a subject in a region in which no fields of view overlap each other can be included in a field of view of a following camera with a slight time lag.

As a result, it can be guaranteed that images of subjects present in all directions are photographed from different viewpoints. For example, when an imaging device formed by superposing color video cameras and depth cameras of a configuration as depicted in the figure in a vertical direction corresponding to a depth direction of the figure is introduced, a depth image can be compressed as in the present embodiment, and an image in a wider range can be transmitted while an increase in data size is suppressed. Incidentally, in a case where the image over 360° on the periphery is not necessary, the number of cameras constituting the imaging device can be reduced. In some cases, images from different viewpoints may be photographed by moving one camera, and two temporally preceding and succeeding photographed images may be set as stereo images at an average time.

Figure 11:
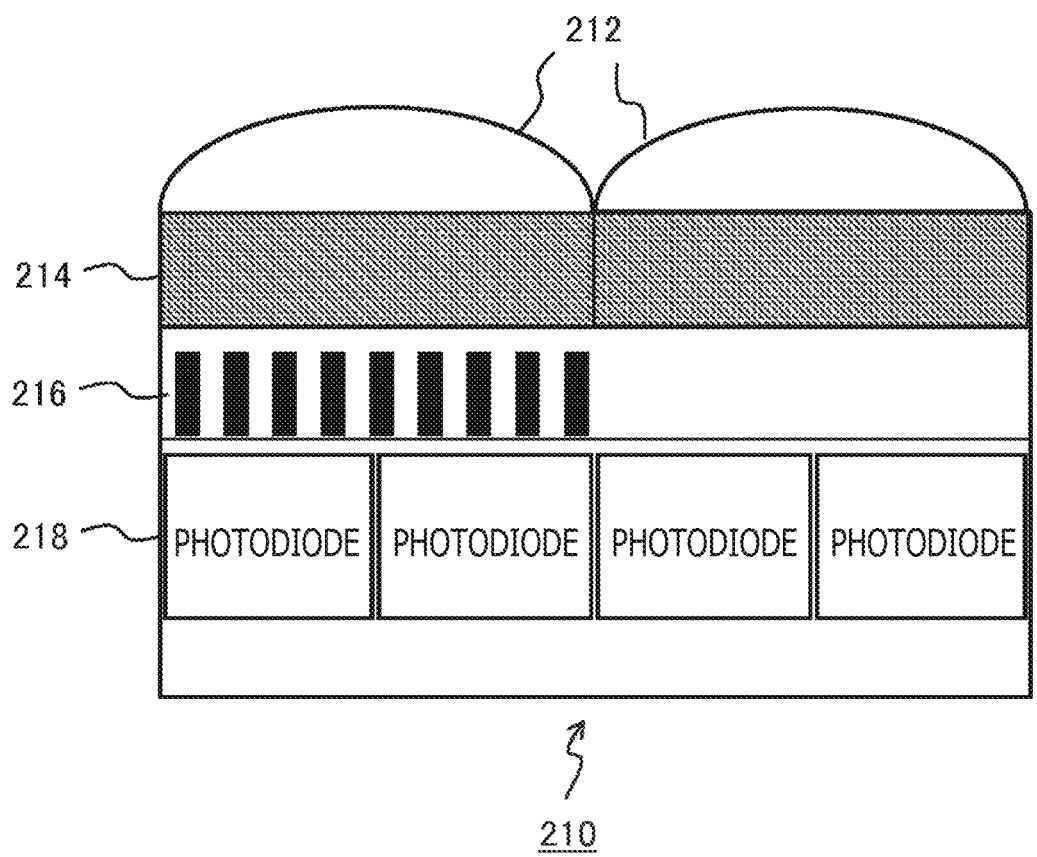
FIG. 11 is a diagram depicting an element structure of an imaging device in a modification.

FIG. 11 depicts an element structure of an imaging device in another modification. Incidentally, the figure schematically depicts a functional structure in an element section, and omits a detailed structure of an inter-layer insulating film, wiring, and the like. In addition, the figure illustrates a sectional structure of two pixels adjacent to each other. Pixels 210 include a microlens layer 212, a color filter layer 214, a polarizer layer 216, and a photoelectric conversion layer 218. The microlens layer 212 is provided for each pixel, and condenses incident light.

The color filter layer 214 transmits light of a color different for each pixel. The polarizer layer 216 includes a wire grid type polarizer formed by arranging a plurality of linear conductor members, for example, members (wires) of tungsten, aluminum, or the like in the form of stripes at intervals smaller than the wavelength of incident light. When light condensed by the microlens layer 212 and transmitted by the color filter layer 214 enters the polarizer layer 216, a polarized light component in a direction parallel with the lines of the polarizer is reflected, and only a perpendicular polarized light component is transmitted.

Polarized light luminance is obtained by converting the transmitted polarized light component into a charge by the photoelectric conversion layer 218. An image obtaining technology using the wire grid type polarizer as depicted in the figure is disclosed in, for example, Japanese Patent Laid-Open No. 2012-80065 or the like. However, the polarizer is not limited to the wire grid type, and may be any of polarizers in practical use such as a linear dichroic polarizer. Incidentally, while the figure depicts the section of wires extending in the depth direction of the drawing as the polarizer, the polarizer is assumed to have four principal axis angles, and the orientation of the wires differs accordingly.

In addition, as depicted in the figure, the polarizer layer 216 may have a region including the polarizer and a region not including the polarizer depending on the pixels. In the region not provided with the polarizer, light passing through the color filter layer 214 enters the photoelectric conversion layer 218 as it is. The photoelectric conversion layer 218 includes ordinary photodiodes. The photoelectric conversion layer 218 outputs the incident light as a charge. As depicted in the figure, a plurality of photodiodes are provided for one microlens. The light passing through different regions of the focusing lens is thereby converted into charges separately. A technology that performs focus detection on the basis of a phase difference of the thus detected light has been put to practical use as one method of phase difference autofocus (see Japanese Patent Laid-Open No. 2013-106194, for example).

In addition, when values detected by a plurality of photodiodes provided for one pixel are summed, the luminance of one pixel in an ordinary imaging device is obtained. That is, according to the element structure of the pixels depicted in FIG. 11, an ordinary color image, polarized light images in a plurality of orientations, and a phase difference image can be obtained at the same time. Here, the phase difference image is a pair of images having, as a pixel, only the detected value of one of the two photodiodes provided for each pixel. An amount of displacement of the position of an image in the phase difference image is zero at a focal length, and is increased with increasing distance from the focal length. In addition, the direction of the displacement is reversed depending on whether the distance of the image is longer than the focal length or shorter than the focal length.

Utilizing this relation, the image processing device can obtain the distance of a subject from the amount of displacement of the image in the phase difference image. However, because being able to identify the amount of displacement is a precondition, the distance is obtained only for a part in which a feature point exists, such as a contour line of the subject. Accordingly, the distance value of the whole of the subject is obtained when a normal vector of a surface of the subject is obtained by an existing method using polarized light images in a plurality of orientations, and interpolating the distance value on the basis of a resultantly obtained inclination of the surface.

That is, according to the element structure depicted in the figure, a depth image from the same viewpoint as a color image can be obtained without the provision of a reference light irradiating mechanism or the like. In order to generate the depth image by operation, which depth image is used to generate the difference image, stereo images may be obtained by introducing an ordinary camera separately from the camera of the element structure as depicted in the figure, and making the ordinary camera photograph from a different viewpoint. Alternatively, the stereo images may be obtained by a plurality of cameras having the element structure as depicted in the figure. In this case, an imaging device having a structure as depicted in FIG. 10 may be used.

In addition, the stereo images may be obtained by moving one camera having the element structure as depicted in the figure, or the depth image may be obtained from one color image by using the depth image providing server 120 depicted in FIG. 8. In either case, similar effects can be obtained by applying the image processing device and the content processing device described in the present embodiment.

REFERENCE SIGNS LIST

1 Content processing system, 10 Image processing device, 12 Imaging device, 14 Content processing device, 16 Display device, 18 Stereo camera, 19 Depth camera, 23 CPU, 24 GPU, 26 Main memory, 32 Communicating unit, 34 Storage unit, 36 Output unit, 38 Input unit, 40 Recording medium driving unit, 50 Stereo image obtaining section, 52 Depth image obtaining section, 54 Depth image compressing section, 56 Output section, 60 Image data obtaining section, 62 Depth image decompressing section, 64 Information processing section, 66 Output section.

INDUSTRIAL APPLICABILITY

As described above, the present invention is applicable to various kinds of devices such as an imaging device, a head-mounted display, a sensor, an image processing device, and a content reproducing device, systems including the various kinds of devices, and the like.

The invention claimed is:

1. An image processing device comprising:
a depth image obtaining section configured to obtain data of a first depth image of a subject by using a depth camera measuring a distance from the depth camera to the subject;
a photographed image obtaining section configured to obtain data of a plurality of stereo images formed by photographing the subject from different viewpoints using stereo cameras, wherein a second depth image is obtained by operation using the stereo images;
a depth image compressing section configured to compress the data of the first and second depth image using a newly generated difference image generated based on a difference between the first and second depth image, the difference image indicating differences between the pixel values of the first and second depth images; and
an output section configured to output the data of the plurality of photographed images and the compressed data of the depth image,
wherein the depth image compressing section: (i) assigns the number of gradations per unit distance according to the distance of the subject in a region of an image of the subject in the depth image, and (ii) quantizes the pixel value of the depth image such that the number of gradations per unit distance in a distance range in which the subject is not present is smaller than the number of gradations per unit distance in a distance range in which the subject is present.

2. The image processing device according to claim 1, wherein the depth image compressing section generates, as the data after being compressed, a difference image between the depth image to be compressed and a depth image obtained by operation on a basis of a parallax between corresponding points in two photographed images.

3. The image processing device according to claim 1, wherein the depth image compressing section makes the number of gradations per unit distance different according to the distance indicated by the pixel value in the depth image, and quantizes the pixel value.

4. The image processing device according to claim 3, wherein the depth image compressing section increases the number of gradations per unit distance as the distance indicated by the pixel value in the depth image is decreased, and quantizes the pixel value.

5. The image processing device according to claim 3, wherein the depth image compressing section further generates information indicating correspondence relation between pixel values before and after the quantization.

6. The image processing device according to claim 2, wherein
the depth image obtaining section obtains data of a plurality of depth images actually measured by the camera from different viewpoints, and
the depth image compressing section generates the difference image for each of the plurality of depth images.

7. The image processing device according to claim 2, wherein the depth image compressing section converts the depth image based on the parallax into a depth image from a viewpoint when the depth image to be compressed is actually measured, and generates the difference image between the converted depth image and the depth image to be compressed.

8. The image processing device according to claim 1, further comprising:
a communicating section configured to connect to a server that provides data of a depth image corresponding to a photographed image on a basis of data of the photographed image by having a machine learning function, wherein
the depth image compressing section obtains the data of the corresponding depth image by transmitting the data of the photographed image to the server, and generates, as the data after being compressed, data of a difference image between the depth image and the depth image to be compressed.

9. A content processing device comprising:
an image data obtaining section configured to obtain data of a plurality of stereo images by using stereo cameras to photograph a subject from different viewpoints and data of a depth image actually measured by a depth camera measuring a distance of the subject and having the distance as a pixel value, the depth image measured by the depth camera is a first depth image and a depth image obtained by operation using the stereo images is a second depth image;
a depth image decompressing section configured to decompress the data of the first and second depth image after compression thereof, wherein the compressed data was generated using a newly generated difference image generated based on a difference between the first and second depth image, the difference image indicating differences between the pixel values of the two depth images; and
an output section configured to perform predetermined processing using at least the decompressed data of the first and second depth image, and output a result,
wherein the data of the first and second depth image were compressed using a depth image compressing section that: (i) compresses using a newly generated difference image generated based on a difference between the first and second depth image, the difference image indicating differences between the pixel values of the first and second depth images, (ii) assigns the number of gradations per unit distance according to the distance of the subject in a region of an image of the subject in the depth image, and (iii) quantizes the pixel value of the depth image such that the number of gradations per unit distance in a distance range in which the subject is not present is smaller than the number of gradations per unit distance in a distance range in which the subject is present.

10. The content processing device according to claim 9, wherein the depth image decompressing section decompresses the depth image by adding a depth image obtained by operation on a basis of a parallax between corresponding points in two photographed images to the depth image after the compression.

11. The content processing device according to claim 9, wherein
the image data obtaining section obtains information indicating correspondence relation between pixel values before and after quantization together with the data after the compression of the depth image in which the pixel value is quantized, and
the depth image decompressing section restores the pixel value of the depth image after the compression to the pixel value before the quantization on a basis of the information indicating the correspondence relation.

12. The content processing device according to claim 9, further comprising:
a communicating section configured to connect to a server that provides data of a depth image corresponding to a photographed image on a basis of data of the photographed image by having a machine learning function, wherein the depth image decompressing section obtains the data of the corresponding depth image by transmitting the data of the photographed image to the server, and decompresses the depth image by adding together the depth image and the depth image after the compression.

13. The content processing device according to claim 9, wherein
the image data obtaining section obtains the data of the depth image at a frame rate lower than the data of the photographed images, and
the depth image decompressing section interpolates the depth image on a time axis on a basis of a motion vector obtained from the photographed images.

14. The content processing device according to claim 9, wherein
the image data obtaining section obtains the data of the depth image at a frame rate lower than the data of the photographed images, and
the depth image decompressing section interpolates the depth image on a time axis on a basis of a motion vector obtained from a depth image generated by using the data of the plurality of photographed images.

15. A content processing system comprising:
an image processing device configured to transmit data of a first depth image measured by a camera measuring a distance from the camera to a subject and having the distance as a pixel value and data of a second depth image obtained by operation using a plurality of stereo images formed by photographing the subject from different viewpoints; and
a content processing device configured to perform information processing using the data of the first depth image and the data of the second depth image;
the image processing device including
a depth image compressing section configured to compress the data of the first and second depth image using a newly generated difference image generated based on a difference between the first and second depth image, the difference image indicating differences between the pixel values of the two depth images; and
an output section configured to output the data of the plurality of stereo images and the data of the first and second depth image after the compression; and
the content processing device including
a depth image decompressing section configured to decompress the data of the first and second depth image after the compression using the data of the plurality of stereo images; and
an output section configured to perform predetermined processing using at least the decompressed data of the first and second depth image, and output a result,
wherein the depth image compressing section (i) assigns the number of gradations per unit distance according to the distance of the subject in a region of an image of the subject in the depth image, and (ii) quantizes the pixel value of the depth image such that the number of gradations per unit distance in a distance range in which the subject is not present is smaller than the number of gradations per unit distance in a distance range in which the subject is present.

16. The image processing device according to claim 1, wherein the depth camera and the stereo cameras are housed in an imaging device in which the depth camera is interposed between the stereo cameras.

17. The image processing device according to claim 1, wherein the difference image obtaining section is implemented by a circuit similar to a circuit that obtains differences between frames of a moving image, the circuit being used for a technology of conventional differential pulse-code modulation (DPCM).

* * * * *